(12) United States Patent  (10) Patent No.: US 7,492,494 B2
Goto et al.  (45) Date of Patent: Feb. 17, 2009

(54) QUANTUM COMPUTER AND QUANTUM COMPUTING METHOD

(75) Inventors: Hayato Goto, Kawasaki (JP); Kouichi Ichimura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/028,912

(22) Filed: Feb. 11, 2008

(65) Prior Publication Data

US 2008/0192315 A1 Aug. 14, 2008

(30) Foreign Application Priority Data

Feb. 14, 2007 (JP) ............................. 2007-033046

(51) Int. Cl.
*G06E 3/00* (2006.01)
(52) U.S. Cl. ....................... 359/107; 257/432
(58) Field of Classification Search ................. 359/107; 257/25, 321, 432
See application file for complete search history.

(56) References Cited

U.S. PATENT DOCUMENTS

| 6,800,837 | B1 | 10/2004 | Ichimura et al. |
| 2005/0110106 | A1 | 5/2005 | Goto et al. |
| 2006/0043357 | A1* | 3/2006 | Ichimura et al. ............... 257/14 |
| 2006/0169877 | A1* | 8/2006 | Goto et al. ................... 250/225 |

FOREIGN PATENT DOCUMENTS

JP 2001-209083 8/2001

OTHER PUBLICATIONS

L.-M. Duan, et al., "Robust quantum gates on neutral atoms with cavity-assisted photon scattering", Physical Review A 72, 032333, published Sep. 28, 2005, pp. 1-4.
Hayato Goto, et al., "Multiqubit controlled unitary gate by adiabatic passage with an optical cavity", Physical Review A 70, 012305, published Jul. 9, 2004, pp. 1-8.

\* cited by examiner

*Primary Examiner*—Alessandro Amari
(74) *Attorney, Agent, or Firm*—Oblon, Spivak, McClelland, Maier & Neustadt, P.C.

(57) ABSTRACT

A quantum computer includes: N (where N is an integer of at least 2) physical systems having five states $|0\rangle$, $|1\rangle$, $|2\rangle$, $|3\rangle$ and $|4\rangle$ in which transitions between three lower states $|0\rangle$, $|1\rangle$ and $|2\rangle$ and two upper states $|3\rangle$ and $|4\rangle$ are optically allowed; and an optical resonator in which the N physical systems are disposed. A transition frequency of a transition between $|2\rangle$ and $|3\rangle$ in all physical systems is equal to a resonant frequency of the optical resonator, a distribution width of a transition frequency between $|3\rangle$ and $|4\rangle$ is at least N times greater than a maximum value of transition frequencies between the three lower states, and light which is resonant with a transition between $|0\rangle$ and $|4\rangle$, between $|1\rangle$ and $|4\rangle$, or between $|2\rangle$ and $|4\rangle$ in a certain physical system is sufficiently off-resonant with all optical transitions in other physical systems.

8 Claims, 4 Drawing Sheets

QUANTUM COMPUTER AND QUANTUM COMPUTING METHOD

CROSS-REFERENCE TO RELATED APPLICATION

This application is based upon and claims the benefit of priority from prior Japanese Patent Application No. 2007-33046 filed on Feb. 14, 2007 in Japan, the entire contents of which are incorporated herein by reference.

BACKGROUND OF THE INVENTION

1. Field of the Invention

The present invention relates to a quantum computer and a quantum computing method utilizing coupling of an optical resonator and atoms.

2. Related Art

In recent years, research of the quantum computer has been performed vigorously. As a method for implementing the quantum computer, a method of preparing a plurality of physical systems each having three states in an optical resonator, utilizing two lower stable states as quantum bits, and coupling spatially distant physical systems via photons in the optical resonator is proposed (see, for example, JP-A 2001-209083 (KOKAI)). In JP-A 2001-209083 (KOKAI), quantum bits are distinguished with an optical frequency by utilizing the fact that the frequency difference between two lower states differs according to the individual physical system. And the state is operated by utilizing two-photon resonance. If the frequency difference between the lower states is different according to the individual physical system, therefore, two-photon resonance occurs in only one physical system and the physical system is operated thereby. It thus becomes possible to selectively operate an individual physical system by setting an optical frequency.

Especially in the nuclear spin state of ions doped into crystal, decoherence is very slow. Therefore, a solid-state quantum computer utilizing an energy level (hyperfine level) which depends upon the nuclear spin of ions as the quantum bit and utilizing its inhomogeneous broadening in quantum bit selection is being considered. Since in general the inhomogeneous broadening of the hyperfine level is not so wide, however, it becoming an obstacle to increasing the number of quantum bits is regarded as a problem.

SUMMARY OF THE INVENTION

The present invention has been made in view of these circumstances, and an object thereof is to provide a quantum computer and a quantum computing method capable of increasing the number of quantum bits.

According to a first aspect of the present invention, there is provided a quantum computer including: N (where N is an integer of at least 2) physical systems having five states $|0\rangle$, $|1\rangle$, $|2\rangle$, $|3\rangle$ and $|4\rangle$ in which transitions between three lower states $|0\rangle$, $|1\rangle$ and $|2\rangle$ and two upper states $|3\rangle$ and $|4\rangle$ are optically allowed; and an optical resonator in which the N physical systems are disposed, wherein a transition frequency of a transition between $|2\rangle$ and $|3\rangle$ in all physical systems is equal to a resonant frequency of the optical resonator, a distribution width of a transition frequency between $|3\rangle$ and $|4\rangle$ is at least N times greater than a maximum value of transition frequencies between the three lower states, and light which is resonant with a transition between $|0\rangle$ and $|4\rangle$, between $|1\rangle$ and $|4\rangle$, or between $|2\rangle$ and $|4\rangle$ in a certain physical system is sufficiently off-resonant with all optical transitions in other physical systems.

According to a second aspect of the present invention, there is provided a quantum computer including: N (where N is an integer of at least 2) physical systems having seven states $|0\rangle$, $|1\rangle$, $|2\rangle$, $|3\rangle$, $|4\rangle$, $|5\rangle$ and $|6\rangle$ in which transitions between five lower states $|0\rangle$, $|1\rangle$, $|2\rangle$, $|5\rangle$ and $|6\rangle$ and two upper states $|3\rangle$ and $|4\rangle$ are optically allowed; and an optical resonator in which the N physical systems are disposed, wherein a transition frequency of a transition between $|2\rangle$ and $|3\rangle$ in all physical systems is equal to a resonant frequency of the optical resonator, a distribution width of a transition frequency between $|3\rangle$ and $|4\rangle$ is at least N times greater than a maximum value of transition frequencies between the three lower states, and light which is resonant with a transition between $|0\rangle$ and $|4\rangle$, between $|1\rangle$ and $|4\rangle$, between $|2\rangle$ and $|4\rangle$, between $|2\rangle$ and $|5\rangle$, or between $|6\rangle$ and $|4\rangle$ in a certain physical system is sufficiently off-resonant with all optical transitions in other physical systems.

According to a third aspect of the present invention, there is provided a quantum computation method using the quantum computer according to the first aspect, the quantum computation method comprising, for two physical systems: changing state $|0\rangle$ to state $|2\rangle$ by utilizing light which is resonant with transitions between $|0\rangle$ and $|4\rangle$ and between $|2\rangle$ and $|4\rangle$; causing an optical pulse which is resonant with the resonator to be incident on the resonator; and performing controlled phase-flip gate operation on a quantum bit composed of the state $|0\rangle$ and the state $|1\rangle$ of the two physical systems by utilizing light which is resonant with transitions between $|0\rangle$ and $|4\rangle$ and between $|2\rangle$ and $|4\rangle$ to return the state $|2\rangle$ to the state $|0\rangle$.

According to a fourth aspect of the present invention, there is provided a quantum computation method using the quantum computer according to the second aspect, the quantum computation method comprising, for a k-th physical system and an m ($\neq$k)-th physical system: changing the state $|1\rangle$ to the state $|5\rangle$ in the k-th physical system by utilizing light which is resonant with transitions between $|1\rangle$ and $|4\rangle$ and between $|5\rangle$ and $|4\rangle$, and changing the state $|1\rangle$ to the state $|2\rangle$ in the m-th physical system by utilizing light which is resonant with transitions between $|1\rangle$ and $|4\rangle$ and between $|2\rangle$ and $|4\rangle$; performing adiabatic passage utilizing the resonator by using two optical pulses which are resonant with a transition between $|5\rangle$ and $|3\rangle$ in the k-th physical system and a transition between $|6\rangle$ and $|3\rangle$ in the m-th physical system; performing adiabatic passage utilizing the resonator by using two optical pulses which are different in relative phase from the foregoing two optical pulses by 180 degrees and which are resonant with the transition between $|5\rangle$ and $|3\rangle$ in the k-th physical system and the transition between $|6\rangle$ and $|3\rangle$ in the m-th physical system; and performing controlled phase-flip gate operation on a quantum bit composed of the state $|0\rangle$ and the state $|1\rangle$ of the k-th physical system and the m-th physical system, by utilizing light which is resonant with transitions between $|1\rangle$ and $|4\rangle$ and between $|5\rangle$ and $|4\rangle$ in the k-th physical system to return the state $|5\rangle$ to the state $|1\rangle$ and utilizing light which is resonant with transitions between $|1\rangle$ and $|4\rangle$ and between $|2\rangle$ and $|4\rangle$ in the m-th physical system to return the state $|2\rangle$ to the state $|1\rangle$.

DESCRIPTION OF THE EMBODIMENTS

Hereafter, embodiments of the present invention will be described with reference to the drawings.

Figure 1:
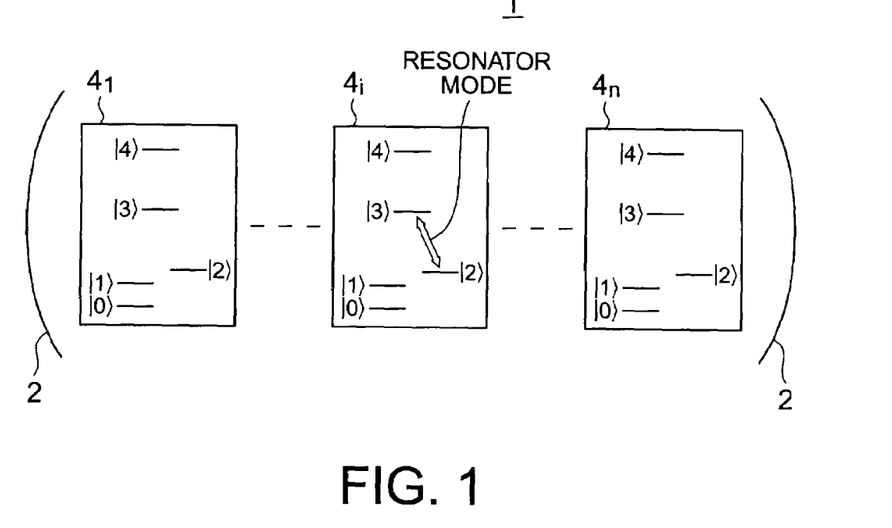
FIG. 1 is a diagram showing a basic configuration of a quantum computer according to an embodiment.

A quantum computer according to an embodiment of the present invention is shown in FIG. 1. A quantum computer 1 according to the embodiment includes an optical resonator 2 in which a plurality of physical systems $4_1$ to $4_N$ are arranged. As shown in FIG. 1, each physical system $4_i$ (i=1, ..., N) has three ground states |0>, |1> and |2> and two excited states |3> and |4>.

In the present embodiment, the state |0> and the state |1> are used as a quantum bit. Transition between |k> and |m> (k=0, 1, 2; m=3, 4) is optically allowed. In the present embodiment, it is supposed with respect to all physical systems $4_1$ to $4_N$ that the transition frequency between |2> and |3> is equal to the resonance frequency of the optical resonator 2. And it is supposed that the width of distribution of the transition frequency between |3> and |4> is sufficiently greater than the transition frequencies between the ground states. For example, if there are N physical systems, it is supposed that the width of distribution of the transition frequency between |3> and |4> is greater than the highest value of the transition frequencies between the ground states by at least N times. It is also supposed that light which is resonant with a transition between |0> and |4>, between |1> and |4>, or between |2> and |4> in a certain physical system $4_i$ is sufficiently off-resonant with all optical transitions in a different physical system $4_j$ (j≠i). When operating the state of a certain physical system $4_i$ by using light which is resonant with the transition between |0> and |4>, between |1> and |4>, or between |2> and |4> of its ions, therefore, the state in the different physical system $4_j$ does not change and consequently each physical system $4_i$ (i=1, ..., N) can be selectively operated.

In the related art, quantum bits are distinguished utilizing inhomogeneous broadening between lower levels and the two-photon resonance. In the present embodiment, however, quantum bits are distinguished on the basis of the inhomogeneous broadening of the excited state. Since the inhomogeneous broadening of the excited state is in general greater than the inhomogeneous broadening between ground states, the possibility that the number of quantum bits can be increased is high in the present embodiment as compared with the related art.

When executing one-quantum-bit gate operations on a quantum bit in a certain physical system, it should be executed by utilizing light which is resonant with the transitions between |0> and |4>, between |1> and |4>, and between |2> and |4>. In the present embodiment, a known method is used as a concrete implementation method for the one-quantum-bit gate operations. The known method is described, for example, in Z. Kis, F. Renzoni, Phys. Rev. A 65, 032318 (2002) or L.-M. Duan, J. I. Cirac, P. Zoller, Science 292, 1695 (2001). Since a different physical system is off-resonant with utilized light at this time, the different physical system does not change.

Hereafter, a method for executing two-quantum-bit gate operations will be described. In the present embodiment, two ways are considered as the method for implementing two-quantum-bit gate operations utilizing an optical resonator. The first method is based on L.-M. Duan, B. Wang, H. J. Kimble, Phys. Rev. A 72, 032333 (2005). The second method is based on H. Goto, K. Ichimura, Phys. Rev. A 70, 012305 (2004) which is written by the present inventors. In the latter second method, two additional ground states are needed as compared with the first method.

In the present embodiment, only a controlled phase-flip gate is supposed to be the two-quantum bit gate. In the controlled phase-flip gate, only the phase of the state |1>|1> in which each of two quantum bits is in the state |1> is flipped. It is known that the controlled phase-flip gate and the one-quantum-bit gates constitute a universal set for quantum computation. In other words, a quantum computer can be constituted by using the controlled phase-flip gate and the one-quantum-bit gates.

Execution Method for Controlled Phase-Flip Gate Based on the First Method

First, an execution method for controlled phase-flip gate based on the first method will now be described. First, it is supposed that states of all physical systems are in superposition states of |0> and |1>. It is supposed that a controlled phase-flip gate operation is performed on the k-th physical system $4_k$ and the m-th physical system $4_m$. States of the physical system $4_k$ and the physical system $4_m$ are represented as $|j>_k$ and $|j>_m$ (j=0, 1, 2, 3, 4), respectively. First, a state $|0>_k$ is changed to a state $|2>_k$ by adiabatic passage by using optical pulses which are resonant with transitions between $|0>_k$ and $|4>_k$ and between $|2>_k$ and $|4>_k$ (see K. Bergmann, H. Theuer, B. W. Shore, Rev. Mod. Phys. 70, 1003 (1998)). In the same way, a state $|0>_m$ is changed to a state $|2>_m$ by adiabatic passage by using optical pulses which are resonant with transitions between $|0>_m$ and $|4>_m$ and between $|2>_m$ and $|4>_m$. These changes can be represented by the following expression.

Initial State: $\alpha_{00}|0>_k|0>_m + \alpha_{01}|0>_k|1>_m + \alpha_{10}|1>_k|0>_m + \alpha_{11}|1>_k|1>_m \rightarrow \alpha_{00}|2>_k|2>_m + \alpha_{01}|2>_k|1>_m + \alpha_{10}|1>_k|2>_m + \alpha_{11}|1>_k|1>_m$ Thereafter, a single photon pulse which is resonant with an optical resonator is applied from the outside. As for mirrors of the optical resonator, a total reflection mirror is used as one of them, and a partial transmission mirror is used as another of them. The single photon pulse is incident from the partial transmission mirror. As described in L.-M. Duan, B. Wang, H. J. Kimble, Phys. Rev. A 72, 032333 (2005), the single photon pulse can also be replaced by a weak coherent optical pulse. For brevity, however, only the case of the single photon pulse will now be considered. It is supposed that the coupling constant between a physical system and the optical resonator is greater than the damping rate for a photon in the optical resonator and the relaxation rate of the excited state of the physical system and that the spectrum of the single photon pulse is narrow compared to the coupling constant. If at least one of the physical systems $4_k$ and $4_m$ is in the state |2> at this time, the single photon pulse is reflected without being resonant with the optical resonator by the effect of vacuum Rabi splitting. On the other hand, if both the physical systems $4_k$ and $4_m$ are in the state |1>, the single photon pulse is resonant with the optical resonator and then reflected. As a result, only the phase in a state |1>|1> in which both the physical system $4_k$ and the physical system $4_m$ are in the state |1> is flipped. This is represented by the following expression.

$$\alpha_{00}|2\rangle_k|2\rangle_m + \alpha_{01}|2\rangle_k|1\rangle_m + \alpha_{10}|1\rangle_k|2\rangle_m \alpha_{11}|1\rangle_k|1\rangle_m$$
$$\xrightarrow{\gamma^n} \alpha_{00}|2\rangle_k|2\rangle_m + \alpha_{01}|2\rangle_k|1\rangle_m + \alpha_{10}|1\rangle_k|2\rangle_m$$
$$\xrightarrow{\gamma^n} -\alpha_{11}|1\rangle_k|1\rangle_m$$

Finally, the state $|2\rangle_k$ is returned to the state $|0\rangle_k$ and the state $|2\rangle_m$ is returned to the state $|0\rangle_m$ by adiabatic passage by using optical pulses which are resonant with transitions between $|0\rangle_k$ and $|4\rangle_k$, between $|2\rangle_k$ and $|4\rangle_k$, between $|0\rangle_m$ and $|4\rangle_m$, and between $|2\rangle_m$ and $|4\rangle_m$. This is represented by the following expression.

$$\alpha_{00}|2\rangle_k|2\rangle_m + \alpha_{01}|2\rangle_k|1\rangle_m + \alpha_{10}|1\rangle_k|2\rangle_m - \alpha_{11}|1\rangle_k|1\rangle_m$$
$$\xrightarrow{\gamma^n} \alpha_{00}|0\rangle_k|0\rangle_m + \alpha_{01}|0\rangle_k|1\rangle_m + \alpha_{10}|1\rangle_k|0\rangle_m$$
$$\xrightarrow{\gamma^n} -\alpha_{11}|1\rangle_k|1\rangle_m$$

In this way, the controlled phase-flip gate operation can be executed on the physical system $4_k$ and the physical system $4_m$. During this time, other physical systems are not changed.

Execution Method for Controlled Phase-Flip Gate Based on the Second Method

Figure 2:
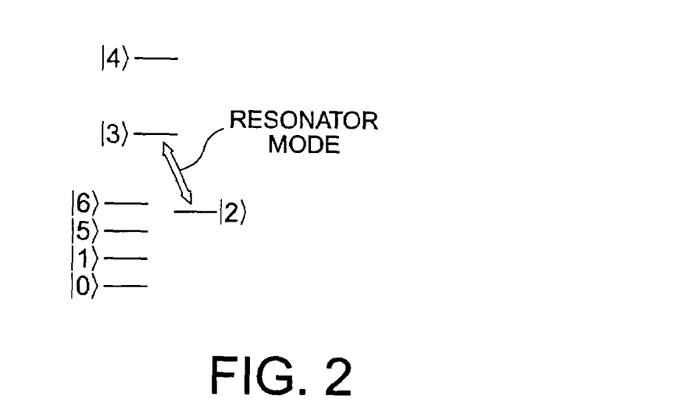
FIG. 2 is a diagram showing a state of a physical system used in a quantum computer according to an embodiment.

An execution method for controlled phase-flip gate based on the method disclosed in the paper written by the present inventors will now be described with reference to FIG. 2. FIG. 2 is a diagram showing a state of a physical system used in a quantum computer according to an embodiment which performs controlled phase-flip gate operation on the basis of adiabatic passage utilizing a resonator. In this case, it is supposed that each physical system $4_i$ (i=1, . . . , N) has two additional ground states $|5\rangle$ and $|6\rangle$ as well as shown in FIG. 2. It is supposed that light which is resonant with a transition between $|5\rangle$ and $|4\rangle$, or between $|6\rangle$ and $|4\rangle$ in a certain physical system $4_i$ (i =1, . . . , N) is sufficiently off-resonant with all optical transitions in a different physical system $4_j$ (j≠i).

First, it is supposed that states of all physical systems are in superposition states of $|0\rangle$ and $|1\rangle$. It is supposed that a controlled phase-flip gate operation is performed on the k-th physical system $4_k$ and the m-th physical system $4_m$. First, a state $|1\rangle_k$ is changed to a state $|5\rangle_k$ and a state $|1\rangle_m$ is changed to a state $|2\rangle_m$ by adiabatic passage by using optical pulses which are resonant with transitions between $|1\rangle_k$ and $|4\rangle_k$, between $|5\rangle_k$ and $|4\rangle_k$, between $|1\rangle_m$ and $|4\rangle_m$, and between $|2\rangle_m$ and $|4\rangle_m$. These changes can be represented by the following expression.

Initial State: $\alpha_{00}|0\rangle_k|0\rangle_m + \alpha_{01}|0\rangle_k|1\rangle_m + \alpha_{10}|1\rangle_k|0\rangle_m$
$$\xrightarrow{\gamma^n} +\alpha_{11}|1\rangle_k|1\rangle_m \to \alpha_{00}|0\rangle_k|0\rangle_m + \alpha_{01}|0\rangle_k|2\rangle_m$$
$$\xrightarrow{\gamma^n} +\alpha_{10}|5\rangle_k|0\rangle_m + \alpha_{11}|5\rangle_k|2\rangle_m$$

Subsequently, adiabatic passage utilizing the optical resonator is performed by using optical pulses which are resonant with transitions between $|5\rangle_k$ and $|3\rangle_k$ and between $|6\rangle_m$ and $|3\rangle_m$. At this time, only a state $|5\rangle_k|2\rangle_m$ changes to a state $|2\rangle_k|5\rangle_m$ and other states do not change (H. Goto, K. Ichimura, Phys. Rev. A 70, 012305 (2004)). As a result, the state becomes as represented by the following expression.

$$\alpha_{00}|0\rangle_k|0\rangle_m + \alpha_{01}|0\rangle_k|2\rangle_m + \alpha_{10}|5\rangle_k|0\rangle_m + \alpha_{11}|5\rangle_k|2\rangle_m$$
$$\xrightarrow{\gamma^n} \alpha_{00}|0\rangle_k|0\rangle_m + \alpha_{01}|0\rangle_k|2\rangle_m + \alpha_{10}|5\rangle_k|0\rangle_m$$
$$\xrightarrow{\gamma^n} +\alpha_{11}|2\rangle_k|6\rangle_m$$

Thereafter, adiabatic passage utilizing the optical resonator is performed by using optical pulses resonant with transitions between $|5\rangle_k$ and $|3\rangle_k$ and between $|6\rangle_m$ and $|3\rangle_m$ which are different in relative phase by 180 degrees from those in the foregoing description. At this time, only a state $|2\rangle_k|5\rangle_m$ changes and other states do not change. As a result, the state becomes as represented by the following expression.

$$\alpha_{00}|0\rangle_k|0\rangle_m + \alpha_{01}|0\rangle_k|2\rangle_m + \alpha_{10}|5\rangle_k|0\rangle_m + \alpha_{11}|2\rangle_k|6\rangle$$
$$\xrightarrow{\gamma^n} \alpha_{00}|0\rangle_k|0\rangle_m + \alpha_{01}|0\rangle_k|2\rangle_m + \alpha_{10}|5\rangle_k|0\rangle_m$$
$$\xrightarrow{\gamma^n} -\alpha_{11}|5\rangle_k|2\rangle_m$$

Finally, the state $|5\rangle_k$ is returned to the state $|1\rangle_k$ and the state $|2\rangle_m$ is returned to the state $|1\rangle_m$ by adiabatic passage by using optical pulses which are resonant with transitions between $|1\rangle_k$ and $|4\rangle_k$, between $|5\rangle_k$ and $|4\rangle_k$, between $|1\rangle_m$ and $|4\rangle_m$, and between $|2\rangle_m$ and $|4\rangle_m$. As a result, the state becomes as represented by the following expression.

$$\alpha_{00}|0\rangle_k|0\rangle_m + \alpha_{01}|0\rangle_k|2\rangle_m + \alpha_{10}|5\rangle_k|0\rangle_m - \alpha_{11}|5\rangle_k|2\rangle_m$$
$$\xrightarrow{\gamma^n} \alpha_{00}|0\rangle_k|0\rangle_m + \alpha_{01}|0\rangle_k|1\rangle_m + \alpha_{10}|1\rangle_k|0\rangle_m$$
$$\xrightarrow{\gamma^n} -\alpha_{11}|1\rangle_k|1\rangle_m$$

In this way, only the phase in a state $|1\rangle|1\rangle$ in which both the physical system $4_k$ and the physical system $4_m$ are in the state $|1\rangle$ is flipped. Therefore, a controlled phase-flip gate for the physical system $4_k$ and the physical system $4_m$ can be executed. In order to make it possible to execute the adiabatic passage utilizing the optical resonator, it is necessary to satisfy the condition that the coupling constant between ions and the optical resonator should be greater than the damping rate for a photon in the optical resonator and the relaxation rate of the excited state of ions, as well as in the case of the first method described earlier.

EXAMPLE 1

Figure 3:
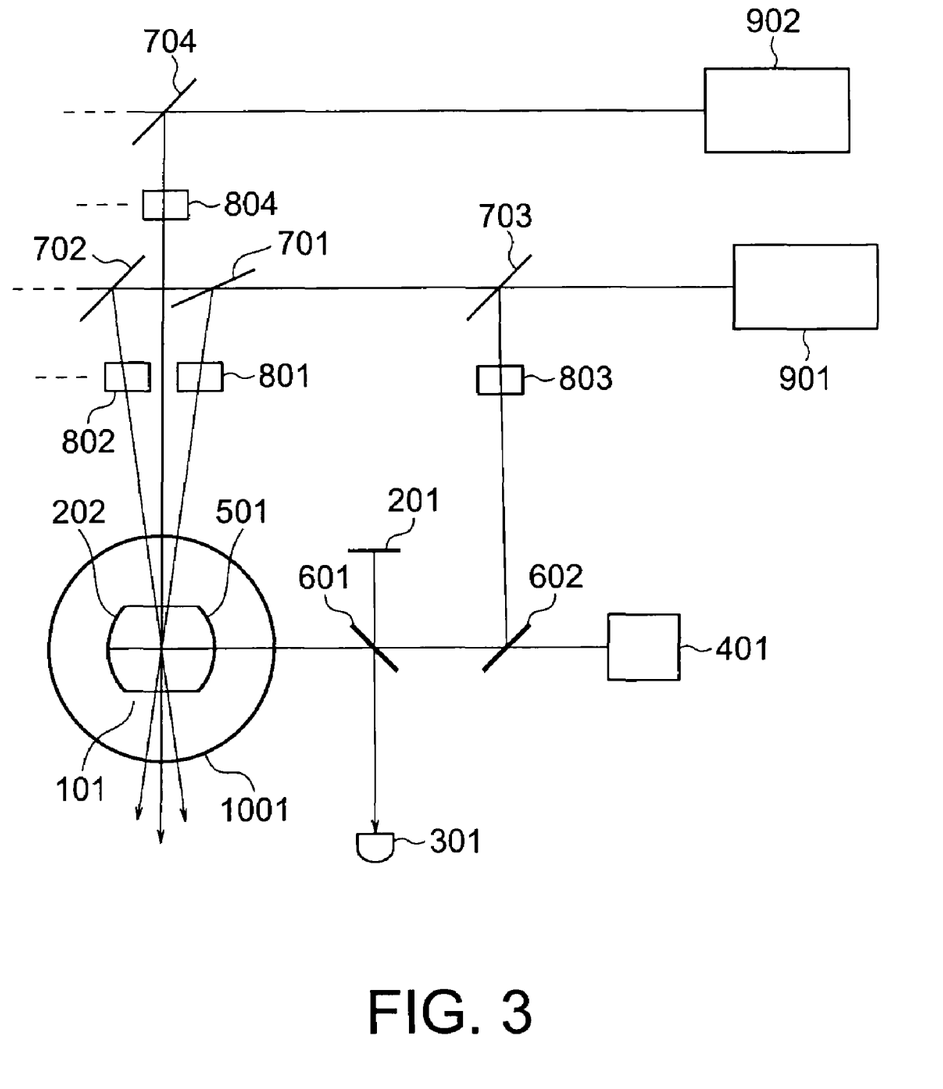
FIG. 3 is a diagram showing an experiment system used in an example 1.

A quantum computer according to an example 1 of the present invention which performs the controlled phase-flip gate on the basis of the first method will now be described with reference to FIG. 3.

Figure 4:
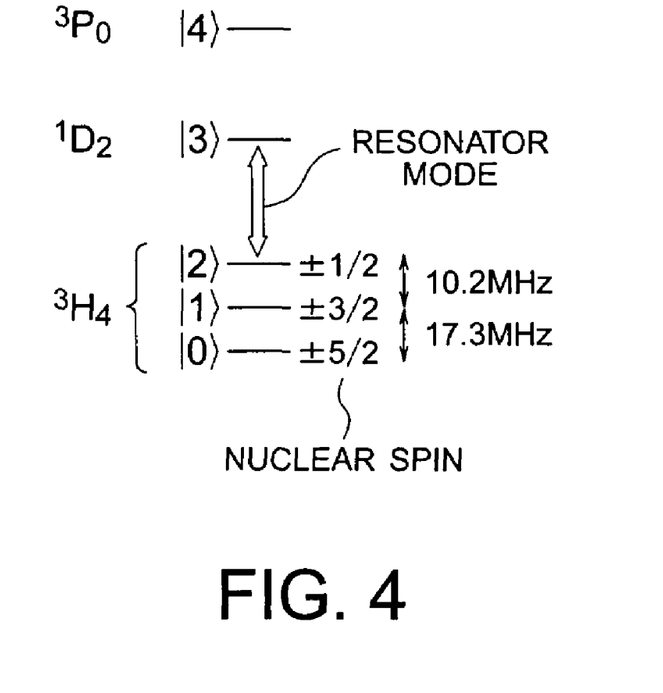
FIG. 4 is a diagram showing state names set in the example 1.

In the present example, $Pr^{3+}$ ions doped into $Y_2SiO_5$ crystal are used as the physical system. As shown in FIG. 4, the above-described states $|0\rangle$, $|1\rangle$ and $|2\rangle$ are set to three hyperfine levels in the ground state $^3H_4$ of $Pr^{3+}$ ions, the above-described state $|3\rangle$ is set to one level in the excited state $^2D_1$, and the above-described state $|4\rangle$ is set to one level in the excited state $^3P_0$. An optical resonator is constituted by forming mirrors on the surface of crystal 101 formed of $Pr^{3+}$:$Y_2SiO_5$. By the way, one side face of the crystal 101 is processed so as to become a total reflection mirror 202, and the other side face opposed to the side face is processed so as to become a partial transmission mirror 501. Among $Pr^{3+}$ ions, ions in which the transition between $|2\rangle$ and $|3\rangle$ just resonates with the resonator mode are used and the state $|0\rangle$ and the state $|1\rangle$ of those ions are utilized as quantum bits. The whole of the crystal 101 formed of $Pr^{3+}$:$Y_2SiO_5$ is placed in a cryostat 1001, and kept at the temperature 4K of liquid helium.

As the light source, two dye lasers 901 and 902 stabilized in frequency are used. The dye laser 901 is used to prepare light which is resonant with transitions between $|0\rangle$ and $|3\rangle$, between $|1\rangle$ and $|3\rangle$, and between $|2\rangle$ and $|3\rangle$. The dye laser 902 is used to prepare light which is resonant with transitions between $|0\rangle$ and $|4\rangle$, between $|1\rangle$ and $|4\rangle$, and between $|2\rangle$ and $|4\rangle$. Laser light generated from the dye laser 901 is split by a beam splitter 703. One beam obtained by splitting is changed to light having a suitably set frequency by being passed through an acoustooptic modulator 803. The other beam obtained by splitting in the beam splitter 703 is incident on a beam splitter 701 and split. One beam obtained by splitting is changed to light having a suitably set frequency by being passed through an acoustooptic modulator 801 and incident on the crystal 101. The other beam obtained by splitting in the beam splitter 701 is incident on a beam splitter 702 and split. One beam obtained by splitting is changed to light having a suitably set frequency by being passed through an acoustooptic modulator 802 and incident on the crystal 101. The other beam obtained by splitting in the beam splitter 702 is used in other physical systems. Laser light generated by the dye laser 902 is split by a beam splitter 704. One beam obtained by splitting is changed to light having a suitably set frequency by being passed through an acoustooptic modulator 804 and incident on the crystal 101. The other beam obtained by splitting in the beam splitter 704 is used in other physical systems.

Figure 5:
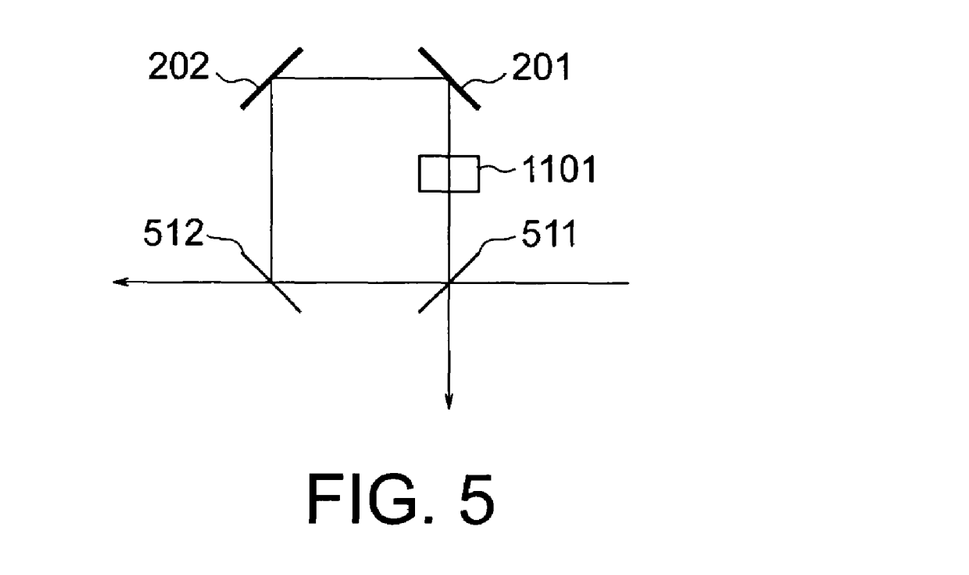
FIG. 5 is a diagram showing a ring-type resonator which implements a variable transmittance mirror.

Light transmitted through the acoustooptic modulator 803 is incident on a variable transmittance mirror 602, reflected thereby, incident on a variable transmittance mirror 601, and incident on the side face 501 of the crystal 101. Each of the variable transmittance mirrors 601 and 602 can be implemented by using, for example, a ring-type resonator shown in FIG. 5. This ring-type resonator includes total reflection mirrors 201 and 202 and partial transmission mirrors 511 and 512, which are disposed at vertexes of a rectangle. The ring-type resonator further includes a phase adjuster 1101 provided between the total reflection mirror 201 and the partial transmission mirror 511. The transmittance of the ring-type resonator can be changed by adjusting the phase of the phase adjuster 1101. By the way, photons generated by a single photon generator 401 are incident on the variable transmittance mirror 601 via the variable transmittance mirror 602.

First, an initialization process will now be described. First, the variable transmittance mirror 601 is set to 100% transmission and the variable transmittance mirror 602 is set to 100% reflection. The resonator is irradiated with light which is resonant with the resonator and which is emitted from the dye laser 901, for some time.

Subsequently, while irradiating the resonator with resonant light is being continued, a central position of the crystal 101 in the resonator mode is irradiated with light having a resonant frequency of the resonator and light having a frequency which is 10.2 MHz higher than the resonant frequency of the resonator from the side face for some time to transfer the population of $Pr^{3+}$ ions to $|0\rangle$. In this way, ions which are resonant in transition from $|2\rangle$ to $|3\rangle$ with the resonator can be initialized to $|0\rangle$ by using ions located in the central position of the crystal in the resonator mode. The state $|0\rangle$ and state $|1\rangle$ of these ions are used as quantum bits. Because of inhomogeneous broadening of the excited state $^3P_0$, transition frequencies between $|0\rangle$ and $|4\rangle$, between $|1\rangle$ and $|4\rangle$, and between $|2\rangle$ and $|4\rangle$ greatly differ between different ions. Furthermore, transition frequencies between $|0\rangle$ and $|4\rangle$, between $|1\rangle$ and $|4\rangle$, and between $|2\rangle$ and $|4\rangle$ greatly differ from transition frequencies between $|0\rangle$ and $|3\rangle$, between $|1\rangle$ and $|3\rangle$, and between $|2\rangle$ and $|3\rangle$. Light which is resonant with a transition between $|0\rangle$ and $|4\rangle$, between $|1\rangle$ and $|4\rangle$, or between $|2\rangle$ and $|4\rangle$ of a certain ion becomes sufficiently off-resonant with all optical transitions of other ions. This is because the inhomogeneous bandwidth of the excited state is on the order of 10 GHz and the frequency difference between ground states is on the order of 10 MHz and consequently it becomes possible to cause the distribution width of the transition between $|3\rangle$ and $|4\rangle$ to be at least N times as compared with the transition frequencies between ground states provided that the number N of utilized ions is less than 1000. Thus, it is possible to distinguish and operate an individual ion by utilizing light which is resonant with transitions between $|0\rangle$ and $|4\rangle$, between $|1\rangle$ and $|4\rangle$, and between $|2\rangle$ and $|4\rangle$.

The controlled phase-flip gate will now be described. Two ions on which the controlled phase-flip gate operation is performed are referred to as first ion and second ion. All ions inclusive of them are initialized to the state $|0\rangle$ by using the above-described method. Implementation of the controlled phase-flip gate can be confirmed as described below. The state of the second ion is converted from $|0\rangle$ to $(|0\rangle+|1\rangle)/2^{1/2}$ by an Hadamard gate using light which is resonant with transitions between $|0\rangle$ and $|4\rangle$, between $|1\rangle$ and $|4\rangle$, and between $|2\rangle$ and $|4\rangle$. The Hadamard gate is a kind of the one-quantum-bit gate and is a gate which converts $|0\rangle$ to $(|0\rangle+|1\rangle)/2^{1/2}$ and converts $|1\rangle$ to $(|0\rangle-|1\rangle)/2^{1/2}$.

If thereafter the controlled phase-flip gate operation is performed on the first ion and the second ion and the Hadamard gate operation is performed on the second ion again, the second ion should return to $|0\rangle$. On the other hand, if only the first ion is prepared in the state $|1\rangle$ and all other ions are prepared in the state $|0\rangle$ at the beginning and similar operations are performed, the state of the second ion should change to $|1\rangle$ this time. In this way, the final state of the second ion changes according to whether the state of the first ion is $|0\rangle$ or $|1\rangle$ at the beginning. Therefore, it can be confirmed thereby whether the controlled phase-flip gate operation has succeeded. For performing the controlled phase-flip gate operation, first, light which is resonant with transitions between $|0\rangle$ and $|4\rangle$ and between $|2\rangle$ and $|4\rangle$ of the first ion and the second ion is applied from the side face of the crystal 101 and the state $|0\rangle$ of the first ion and the second ion is changed to the state $|2\rangle$ by adiabatic passage. Thereafter, both the variable transmittance mirrors 601 and 602 are set to 100% transmission, and the resonator is irradiated with a single photon pulse which is resonant with the resonator, from the single photon generator 401 via the variable transmittance mirrors 602 and 601. And light which is resonant with transitions between $|0\rangle$ and $|4\rangle$ and between $|2\rangle$ and $|4\rangle$ of the first ion and the second ion is applied from the side face and the state $|2\rangle$ is returned to the state $|0\rangle$ by adiabatic passage. In this way, the controlled phase-flip gate for the first ion and the second ion can be implemented (as for details of the principle, see the description of the principle described above). In the present embodiment, the coupling constant between ions and the resonator is approximately 100 kHz, the damping rate for a photon in the resonator is approximately 10 kHz, and the relaxation rate of the excited state of the ions is approximately 10 kHz. Therefore, the condition under which the controlled phase-flip gate succeeds (vacuum Rabi splitting occurs) is satisfied.

For reading whether the final state of the second ion is $|0\rangle$ or $|1\rangle$, first, light which is resonant with transitions between $|1\rangle$ and $|4\rangle$ and between $|2\rangle$ and $|4\rangle$ of the second ion is applied from the side face and the state $|1\rangle$ of the second ion is changed to the state $|2\rangle$ by adiabatic passage. Subsequently, the variable transmittance mirror 601 is set to 50% transmission and the variable transmittance mirror 602 is set to 100% transmission, and the resonator is irradiated with a single photon pulse from the single photon generator 401. The position of the total reflection mirror 201 is set beforehand so as to lead a single photon pulse resonant with the resonator and reflected to a photon detector 301 a hundred percent. Photons reflected by the resonator are detected by the photon detector 301. If the state of the second ion is in $|0\rangle$, photons are resonant with the resonator, led to the photon detector 301 a hundred percent, and detected. On the other hand, if the state of the second ion is in $|2\rangle$, photons are not resonant with the resonator because of the vacuum Rabi splitting. As compared with the case where resonance occurs, the phase deviates by 180 degrees. Photons return to the single photon generator 401 a hundred percent, and photons are not detected by the photon generator 401. If photons are detected, therefore, the final state of the second ion is in |0>. Unless photons are detected, the final state of the second ion is found to be in |1>.

All ions are prepared in the state |0>. The Hadamard gate operation is performed on the second ion, and then controlled phase-flip gate operation is performed on the first ion and the second ion, and the Hadamard gate operation is performed on the second ion again. As a result, the final state of the second ion is |0>. The first ion is prepared in the state |1>, and all other ions are prepared in the state |0>. The Hadamard gate operation is performed on the second ion, and then controlled phase-flip gate operation is performed on the first ion and the second ion, and the Hadamard gate operation is performed on the second ion again. As a result, the final state of the second ion is |1>. In this way, operation of the controlled phase-flip gate is confirmed.

EXAMPLE 2

Figure 6:
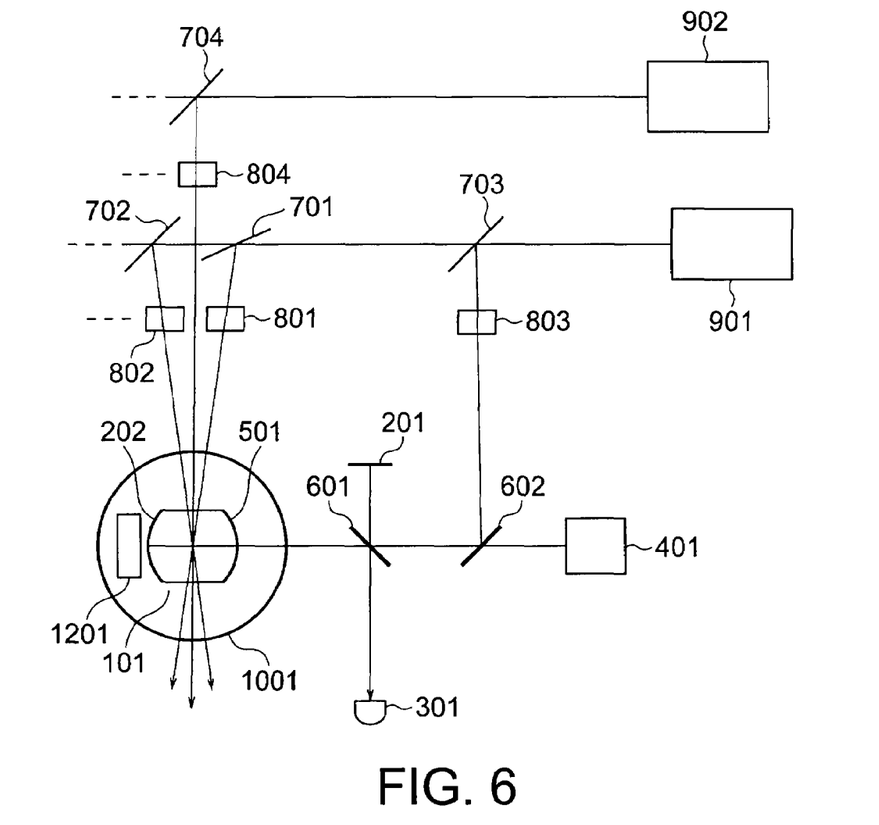
FIG. 6 is a diagram showing an experiment system used in an example 2.

A quantum computer according to an example 2 of the present invention which performs the controlled phase-flip gate on the basis of the second method will now be described with reference to FIG. 6. The present example is the same in the experiment system as the example 1 shown in FIG. 3 except that a magnetic field generator 1201 is provided in the cryostat 1001.

Figure 7:
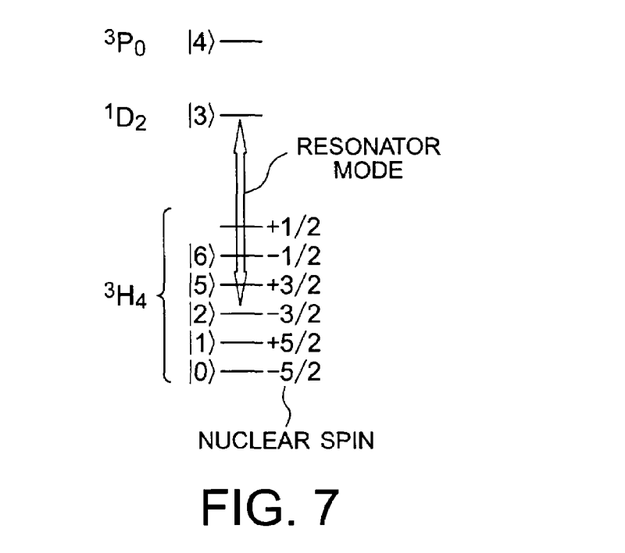
FIG. 7 is a diagram showing state names set in the example 2.

In the same way as the example 1, $Pr^{3+}$ ions doped into $Y_2SiO_5$ crystal are used as the physical system. The whole of the crystal is placed in the cryostat 1001, and kept at the temperature 4K of liquid helium. An external magnetic field is applied to the crystal by the magnetic field generator 1201. As shown in FIG. 7, the above-described states |0>, |1>, |2>, |5> and |6> are set to four among six hyperfine levels obtained by Zeeman splitting of the ground state $^3H_4$ of $Pr^{3+}$ ions, the above-described state |3> is set to one level in the excited state $^2D_1$, and the above-described state |4> is set to one level in the excited state $^3P_0$. In the same way as the example 1, an optical resonator is constituted by forming mirrors on the surface of the crystal. The state |0> and the state |1> of ions in which the transition between |2> and |3> just resonates with the resonator mode among $Pr^{3+}$ ions are utilized as quantum bits.

As the light source, two dye lasers 901 and 902 stabilized in frequency are used. In the same way as the example 1 shown in FIG. 3, light obtained by splitting laser light by using a beam splitter, passing each beam through an acoustooptic modulator, and thereby suitably setting the frequency is used. The dye laser 901 is used to prepare light which is resonant with transitions between |0> and |3>, between |1> and |3>, between |2> and |3>, between |5> and |3>, and between |6> and |3>. The dye laser 902 is used to prepare light which is resonant with transitions between |0> and |4>, between |1> and |4>, between |2> and |4>, between |5> and |4>, and between |6> and |4>.

The initialization process is the same as that in the example 1. Ions which are located in the central position of the crystal in the resonator mode and which are resonant in transition from |2> to |3> with the resonator are initialized to |0>. The state |0> and state |1> of these ions are used as quantum bits.

Hereafter, the controlled phase-flip gate will now be described. Two ions on which the controlled phase-flip gate operation is performed are referred to as first ion and second ion. All ions inclusive of them are initialized to the state |0>. For performing the controlled phase-flip gate operation, first, light which is resonant with transitions between |1> and |4> and between |5> and |4> of the first ion and transitions between |1> and |4> and between |2> and |4> of the second ion is applied from the side face of the crystal 101 and the state |1> of the first ion is changed to the state |5> and the state |1> of the second ion is changed to the state |2> by adiabatic passage.

Subsequently, optical pulses which are resonant with a transition between |5> and |3> of the first ion and a transition between |6> and |3> of the second ion is applied from the side face, and adiabatic passage utilizing the resonator is performed. Then, adiabatic passage utilizing the resonator is performed by using optical pulses which are different in relative phase from the foregoing optical pulses by 180 degrees and which are resonant with the transition between |5> and |3> in the first ion and the transition between |6> and |3> in the second ion.

Finally, the first ion is returned from the state |5> to the state |1> and the second ion is returned from the state |2> to the state |1> by adiabatic passage utilizing optical pulses which are resonant with transitions between |1> and |4> and between |5> and |4> of the first ion and transitions between |1> and |4> and between |2> and |4> of the second ion. In this way, the controlled phase-flip gate for the first ion and the second ion can be implemented (as for details of the principle, see the description of the principle described above). In the same way as the example 1, the coupling constant between ions and the resonator is approximately 100 kHz, the damping rate for a photon in the resonator is approximately 10 kHz, and the relaxation rate of the excited state of the ions is approximately 10 kHz. Therefore, the condition under which the controlled phase-flip gate succeeds (adiabatic passage utilizing the resonator succeeds) is satisfied.

The method for reading the final state of the second ion is the same as that in the example 1.

All ions are prepared in the state |0>. The Hadamard gate operation is performed on the second ion, and then controlled phase-flip gate operation is performed on the first ion and the second ion, and the Hadamard gate operation is performed on the second ion again. As a result, the final state of the second ion is |0>. The first ion is prepared in the state |1>, and all other ions are prepared in the state |0>. The Hadamard gate operation is performed on the second ion, and then controlled phase-flip gate operation is performed on the first ion and the second ion, and the Hadamard gate operation is performed on the second ion again. As a result, the final state of the second ion is |1>. In this way, operation of the controlled phase-flip gate is confirmed.

As heretofore described, the present invention makes it possible to increase the number of quantum bits by setting the optical frequency to selectively operate an individual physical system, coupling spatially remote physical systems via photons of the optical resonator, and utilizing the fact that the optical transition frequency sufficiently differs between different physical systems to select a physical system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A quantum computer comprising:
N (where N is an integer of at least 2) physical systems having five states |0>, |1>, |2>, |3> and |4> in which transitions between three lower states |0>, |1> and |2> and two upper states |3> and |4> are optically allowed; and an optical resonator in which the N physical systems are disposed, wherein a transition frequency of a transition between |2> and |3> in all physical systems is equal to a resonant frequency of the optical resonator, a distribution width of a transition frequency between |3> and |4> is at least N times greater than a maximum value of transition frequencies between the three lower states, and light which is resonant with a transition between |0> and |4>, between |1> and |4>, or between |2> and |4> in a certain physical system is sufficiently off-resonant with all optical transitions in other physical systems.

2. The computer according to claim 1, wherein each physical system is rare-earth ions doped in crystal, and the states |3> and |4> are different electronically excited states of the rare-earth ions.

3. A quantum computation method using the quantum computer according to claim 1, the quantum computation method comprising, for two physical systems:

changing state |0> to state |2> by utilizing light which is resonant with transitions between |0> and |4> and between |2> and |4>;

causing an optical pulse which is resonant with the resonator to be incident on the resonator; and performing controlled phase-flip gate operation on two quantum bits composed of the state |0> and the state |1> of the two physical systems by utilizing light which is resonant with transitions between |0> and |4> and between |2> and |4> to return the state |2> to the state |0>.

4. The method according to claim 3, wherein each physical system is rare-earth ions doped in crystal, and the states |3> and |4> are different electronically excited states of the rare-earth ions.

5. A quantum computer comprising:

N (where N is an integer of at least 2) physical systems having seven states |0>, |1>, |2>, |3>, |4>, |5> and |6> in which transitions between five lower states |0>, |1>, |2>, |5> and |6> and two upper states |3> and |4> are optically allowed; and an optical reasonator in which the N physical systems are disposed, wherein a transition frequency of a transition between |2> and |3> in all physical systems is equal to a resonant frequency of the optical reasonator, a distribution width of a transition frequency between |3> and |4> is at least N times greater than a maximum value of transition frequencies between the three lower states, and light which is resonant with a transition between |0> and |4>, between |1> and |4>, between |2> and |4>, between |2> and |5>, or between |6> and |4> in a certain physical system is sufficiently off-reasonant with all optical transitions in other physical systems.

6. The computer according to claim 5, wherein each physical system is rare-earth ions doped in crystal, and the states |3> and |4> are different electronically excited states of the rare-earth ions.

7. A quantum computation method using the quantum computer according to claim 3, the quantum computation method comprising, for a k-th physical system and an m ($\neq$k)-th physical system:

changing the state |1> to the state |5> in the k-th physical system by utilizing light which is resonant with transitions between |1> and |4> and between |5> and |4>, and changing the state |1> to the state |2> in the m-th physical system by utilizing light which is resonant with transitions between |1> and |4> and between |2> and |4>;

performing adiabatic passage utilizing the resonator by using two optical pulses which are resonant with a transition between |5> and |3> in the k-th physical system and a transition between |6> and |3> in the m-th physical system;

performing adiabatic passage utilizing the resonator by using two optical pulses which are different in relative phase from the foregoing two optical pulses by 180 degrees and which are resonant with the transition between |5> and |3> in the k-th physical system and the transition between |6> and |3> in the m-th physical system; and performing controlled phase-flip gate operation on a quantum bit composed of the state |0> and the state |1> of the k-th physical system and the m-th physical system, by utilizing light which is resonant with transitions between |1> and |4> and between |5> and |4> in the k-th physical system to return the state |5> to the state |1> and utilizing light which is resonant with transitions between |1> and |4> and between |2> and |4> in the m-th physical system to return the state |2> to the state |1>.

8. The method according to claim 7, wherein each physical system is rare-earth ions doped in crystal, and the states |3> and |4> are different electronically excited states of the rare-earth ions.

* * * * *